United States Patent [19]
Feifer et al.

[11] Patent Number: 5,643,677
[45] Date of Patent: Jul. 1, 1997

[54] AMINOPLAST/POLYURETHANE WEAR LAYER FOR PVC SUPPORT SURFACE

[75] Inventors: Joseph P. Feifer, Lancaster; Mary B. Grubb, Landisville; Claude R. Rupp, Jr., Lancaster; William T. Sigman, Quarryville, all of Pa.

[73] Assignee: Armstrong World Industries, Inc., Lancaster, Pa.

[21] Appl. No.: 306,529

[22] Filed: Sep. 15, 1994

Related U.S. Application Data

[63] Continuation of Ser. No. 48,958, Apr. 12, 1993, abandoned, which is a continuation of Ser. No. 407,623, Sep. 15, 1989, abandoned.

[51] Int. Cl.$^6$ .......................... B32B 27/30; B32B 27/38; B32B 27/40; B32B 27/42
[52] U.S. Cl. .......................... 428/424.6; 428/413; 428/502; 428/908.8
[58] Field of Search .......................... 428/413, 424.6, 428/502, 908.8; 525/110, 456; 427/386, 393.5

[56] References Cited

U.S. PATENT DOCUMENTS

| | | | |
|---|---|---|---|
| 4,017,556 | 4/1977 | Wang | 428/502 |
| 4,059,709 | 11/1977 | Conger et al. | 427/264 |
| 4,119,762 | 10/1978 | Anderson et al. | 428/524 |
| 4,197,392 | 4/1980 | Moore | 528/127 |
| 4,278,578 | 7/1981 | Carpenter | 428/424.6 X |
| 4,404,248 | 9/1983 | Spinelli et al. | 428/502 |
| 4,425,466 | 1/1984 | Santer et al. | 524/512 |
| 4,528,344 | 7/1985 | Chang | 525/509 |
| 4,781,987 | 11/1988 | Bolgiano et al. | 428/424.6 |

FOREIGN PATENT DOCUMENTS 1127022  6/1982  Canada.

OTHER PUBLICATIONS

Albert S. Tyskwicz "Innovative Room Temperature Thermosetting Water-Borne Urethane Polymer Systems" Feb. 1987.

*Primary Examiner*—D. S. Nakarani

[57] ABSTRACT

A resilient surface covering has a wear layer including a crosslinked aminoplast/polyurethane which is directly adhered to a vinyl support surface. The adhesion between the wear layer and support surface is improved by including at least 20% polyurethane by weight based on the total amount of aminoplast, polyurethane and epoxy resin in the wear layer composition, or by applying the wear layer composition to a gelled, but unfused vinyl support surface by fusing the vinyl support surface and curing the wear layer in a single step.

8 Claims, 1 Drawing Sheet

AMINOPLAST/POLYURETHANE WEAR LAYER FOR PVC SUPPORT SURFACE

This is a continuation of application Ser. No. 48,958 filed on Apr. 12, 1993, now abandoned, which is a continuation of application Ser. No. 407,623 filed on Sep. 15, 1989, now abandoned.

FIELD OF THE INVENTION

The invention relates to a polyurethane/aminoplast wear layer which is adhered directly to the PVC support surface of a surface covering. More particularly, the invention relates to a wear layer comprising preferably at least 20% by weight of polyurethane based on polyurethane, aminoplast and epoxy resin in the wear layer. Preferably, the wear layer composition is applied to a gelled, unfused vinyl support surface and fused while in contact with the support surface.

BACKGROUND OF THE INVENTION

Bolgiano et al., U.S. Pat. No. 4,781,987, discloses wear layers comprising polyurethane and an aminoplast. However, such wear layers did not adhere well directly to a polyvinyl chloride (PVC) support surface. In fact, the invention of Bolgiano et al. is a wear layer comprising a first or upper, exposed layer comprising polyol, aminoplast and an acid catalyst which is adhered to a second layer of polyurethane. While the first layer may contain polyurethane, the specific teaching of Bolgiano et al. is to interpose the second layer of polyurethane between the first aminoplast-containing layer and the PVC support surface rather than applying the first layer directly on a PVC support surface. Further, the aminoplast/polyurethane compositions as disclosed by Bolgiano et al. are limited to about 9% to about 10% polyurethane by weight based on polyurethane, aminoplast and epoxy resin. Bolgiano et al. is hereby incorporated by reference.

Conger et al., U.S. Pat. No. 4,059,709, discloses a process of applying a urethane wear layer directly to a resilient PVC floor covering. However, there is no disclosure of the use of a polyurethane/aminoplast wear layer composition.

Further, Conger et al. disclose a solvent based wear layer composition. The use of a solvent not only eliminates the solubility problems of an aqueous system, but it is known in the art that solvents improve adhesion to a vinyl system. The solvent swells the vinyl permitting the wear layer composition to obtain a better "bite".

As indicated by Bolgiano et al., the urethane layer of Conger et al. has certain drawbacks, including being more susceptible to staining. See Bolgiano et al., column 1, lines 32–39. The solution of Bolgiano et al. is to substitute an aminoplast composition for the polyurethane composition of Conger et al. However, as stated by Bolgiano et al. at column 1, lines 54–56, such aminoplast compositions have never been successfully applied to flooring structures, in particular, to vinyl flooring structures. Therefore, Bolgiano et al. teaches that aminoplast compositions including those containing a polyurethane, such as Examples 13 to 18, do not adhere well directly to vinyl flooring structures. Rather, their invention is to dispose a polyurethane layer between the aminoplast/urethane layer and the PVC layer.

Other prior art, such as Moore, U.S. Pat. No. 4,197,392, and Anderson et al., U.S. Pat. No. 4,119,762, suggest aminoplast coatings. However, these do not suggest the use of polyurethane in combination with the aminoplast.

While Chang, U.S. Pat. No. 4,528,344, discloses generically a coating composition of polyurethane and the reaction product of a non-aromatic polyol having a molecular weight of less than 230 and an aminoplast, there are no examples of such a combination. Further, there is no indication of the amount of polyurethane to be included in the composition or the application of such a composition directly to a PVC support surface. In the only example in which the composition is applied to a support surface, Example 8(b), the reaction product is mixed with a pigment, acrylic resin, epoxy resin, xylene and catalyst, and is applied to a zinc phosphate-treated metal panel. The remaining examples merely give examples of the polyol/aminoplast reaction product.

Santer et al., U.S. Pat. No. 4,425,466, discloses a coating composition comprising an aminoplast and a polyfunctional compound including a urethane polyol. There is no suggestion of applying such a coating composition directly to a PVC support surface. In fact, at column 4, lines 67–68, they indicate the use of a coating compositions on oily steel.

As used herein, the terms "polyvinyl chloride", "PVC" and "vinyl" are intended to include homopolymers containing only vinyl chloride units, copolymers consisting of two homopolymers such as vinyl chloride and vinyl acetate, and compositions containing such homopolymers and copolymers.

It is an object of the invention to provide a wear layer having stain resistance superior to polyurethane which wear layer will adhere well directly to a PVC support surface.

A further object is to provide an aqueous-based composition which yields such a wear layer.

Other objects and advantages of the invention will become apparent upon reading the following detailed description.

SUMMARY OF THE INVENTION

In accordance with the present invention, a crosslinked aminoplast/polyurethane wear layer may be directly bonded to a resilient polyvinyl chloride support surface if the wear layer composition includes at least 20% polyurethane by weight based on polyurethane, aminoplast and epoxy resin in the wear layers or the aminoplast/polyurethane wear layer composition is applied directly to the resilient polyvinyl chloride support surface while the support surface is in a gelled, unfused condition, and the support surface and the wear layer are fused while in contact with each other.

The addition of epoxy resin to the wear layer composition improves stain resistance. Gloss retention is improved by the addition of an acrylate or methacrylate polymer.

Preferably, the wear layer is acid catalyzed. The preferred aminoplast is an alkylated melamine formaldehyde resin.

DETAILED DESCRIPTION

Figure 1:
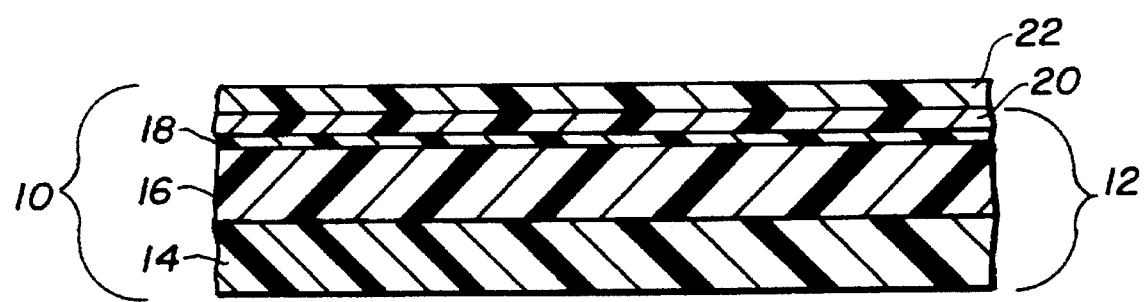
FIG. 1 shows a cross-sectional view of a portion of resilient surface covering having the coating of the present invention.

In the drawing, a portion of a resilient surface covering 10 is shown in cross-section. The surface covering 10 comprises a resilient support surface 12 which includes a substrate material 14 and a layer of foamed or non-foamed material 16. The foamed or non-foamed layer 16 is typically a vinyl layer.

The layer 16 is printed with a decorative design 18. The design 18 is overlayed with a PVC plastisol layer 20.

A crosslinked aminoplast/polyurethane wear layer 22 is bonded directly to the PVC plastisol layer or support surface 20.

In one embodiment of the invention, adherence of the aminoplast wear layer to the PVC support surface is improved by increasing the amount of polyurethane. Good adhesion is obtained if the wear layer composition includes at least 20% polyurethane by weight based on polyurethane, aminoplast, and any epoxy resin in the wear layer. Preferably, the wear layer is 30% to 55% polyurethane by weight based on polyurethane, aminoplast, and epoxy resin in the wear layer. A preferred composition includes 15% to 55% aminoplast by weight and 10% to 50% epoxy resin by weight.

In one preferred embodiment, the wear layer composition is an aqueous-based coating composition. Aqueous-based compositions reduce the environmental problems which occur in the workplace. However, they tend to adhere poorly to a PVC support surface. The solvent in solvent-based systems tend to soften the vinyl which permits good chemical and/or mechanical bite of the coating composition into the vinyl layer. If the aqueous-based coating composition is applied to a gelled but unfused support surface and the coating composition and support surface then fused, better adherence is obtained. Further, the polyurethane will crosslink with the aminoplast and will result in better adherence between the wear layer and support surface.

EXAMPLE 1

A coating having the following composition was applied by a reverse roll coater at a wet thickness of 1.5 to 2.5 mils on a PVC support surface.

| Ingredient | % Solids | Charge Wt. (in parts by weight) | Total Solids[1] |
|---|---|---|---|
| Polyurethane[2] | 35.0 | 108.00 | 33% |
| Melamine[3] | 84.0 | 72.00 | 53% |
| Acrylic Latex[4] | 46.5 | 36.00 | |
| Epoxy Resin[5] | 60.0 | 27.00 | 14% |
| p-Toluenesulfonic Acid | 20.0 | 6.56 | |
| Silica | 4.0 | 78.00 | |
| Water | 0 | 135.00 | |
| Wetting/Leveling Agents | 10.0 | 4.56 | |

[1]Based on polyurethane, melamine, and epoxy resin
[2]Spencer Kellogg XP5460, a polyurethane having a carboxyl terminal end group
[3]Monsanto Resimene 717
[4]Rohm and Haas Rhoplex AC1822
[5]Hi-Tek Polymers CMD W60-5520

The coating was cured at 192° C. for one minute, 45 seconds. The above formulation yielded a wear layer having good adhesion as well as optimum gloss retention and stain resistance properties. Resimene 717 is the preferred melamine because of its vinyl stabilization enhancement. The silica flatting agent was added to lower initial gloss to 50 as measured by the 60° Gardner Gloss Meter. The silica concentration can be adjusted to obtain higher or lower initial gloss without affecting gloss retention properties. However, stain resistance is decreased with increasing silica concentration. The wetting/leveling agents were used to improve the coating operation.

EXAMPLE 2

A coating having the following composition was applied by a reverse roll coater at a wet thickness of 1.5 to 2.5 mils on a PVC support surface.

| Ingredient | % Solids | Charge Wt. (in parts by weight) | Total Solids[1] |
|---|---|---|---|
| Polyurethane[2] | 30.0 | 39.0 | 48% |
| Melamine[3] | 84.0 | 9.9 | 34% |
| Acrylic Latex[4] | 46.5 | 11.1 | |
| Epoxy Resin[5] | 60.0 | 7.1 | 18% |
| p-Toluenesulfonic Acid | 20.0 | 1.1 | |
| Silica | 12.0 | 18.5 | |
| Water | 0 | 18.8 | |
| Wetting/Leveling Agents | 10.0 | 1.5 | |

[1]Based on polyurethane, melamine, and epoxy resin
[2]Spencer Kellogg EA6010, a polyurethane having a carboxyl terminal end group
[3]Monsanto Resimene 717
[4]Rohm and Haas Rhoplex AC1822
[5]Hi-Tek Polymers CMD W60-5520

The coating was cured at 192° C. for two minutes. The above formulation yielded a wear layer having good adhesion as well as optimum gloss retention and stain resistance properties. The silica flatting agent was added to lower initial gloss to 35 as measured by the 60° Gardner Gloss Meter.

EXAMPLE 3

An aqueous solution containing the following composition was neutralized to a pH of about 8 with ammonium hydroxide and coated on a fused, expanded vinyl barrier coat using a 0.003 inch drawdown blade.

| Ingredient | Charge Wt. | % by Wt. |
|---|---|---|
| Water | 27.2 | |
| Melamine[1] | 3.2 | 27 |
| Polyurethane[2] | 8.0 | 20 |
| Epoxy Resin[3] | 11.6 | 53 |
| Surfactant[4] | .56 | |
| p-Toluenesulfonic Acid | .42 | |

[1]Monsanto Resimene 745
[2]Sanncor Sancure 847, a polyurethane having a carboxyl terminal end group
[3]Hi-Tek Polymers CMD WJ55-3540
[4]0.06 3M Fluorad FC-430 and 0.5 GAF Igepal CO610

The coating and flooring structure was heated in an oven at 250° F. for ten minutes to give a very flexible, hard, high gloss finish with excellent adhesion and stain resistance.

EXAMPLE 4

An aqueous solution containing the following composition was neutralized to a pH of about 8 with ammonium hydroxide and coated on a printed, gelled PVC support surface with a reverse roll coater.

| Ingredient | Charge Wt. | % by Wt. |
|---|---|---|
| Water | 234.5 | |
| Melamine[1] | 28.8 | 30 |
| Polyurethane[2] | 32.0 | 10 |
| Epoxy Resin[3] | 104.7 | 60 |
| Surfactant[4] | 4.48 | |
| p-Toluenesulfonic Acid | 1.68 | |

[1-3]See Example 3 above.
[4]0.48 3M Fluorad FC-430 and 4.0 GAF Igepal CO610

The coated flooring substrate structure was heated in an oven at 390° F. for two minutes to give a flexible, hard, high gloss finish with excellent adhesion and stain resistance. The coating did not restrict expansion of the foam.

EXAMPLE 5

Examples 3 and 13–18 of the Bolgiano et al. reference were compared with Example 2 of the present invention by coating the compositions directly on three commercial vinyl substrates using the procedure of the Bolgiano et al. examples.

Each of the coated substrates was subjected to cross-hatch adhesion test ASTM D-3359. The results of the adhesion test were as follows:

| | Coating Formulation | | | | | | | |
|---|---|---|---|---|---|---|---|---|
| | Bolgiano et al. Example No. | | | | | | | Example 2 of Present |
| Substrate | 3 | 13 | 14 | 15 | 16 | 17 | 18 | Invention |
| A | F | F | F | F | F | F | F | P |
| B | F | P | F | P | — | F | — | P |
| C | F | P | F | P | F | F | F | P |

As indicated by the above results, Example 3 of Bolgiano et al. which does not include a polyurethane, failed to adhere to all three of the vinyl substrates. The best that can be said of the Bolgiano et al. Examples 13–18 is that the adhesion is marginal. Examples 14 and 16–18 did not adhere to any of the vinyl substrates tested. Examples 13 and 15 adhered to Substrates B and C while failing to adhere to Substrate A.

The major difference between Substrates B and C and Substrate A is that the raw materials of Substrate A are of American manufacture while the raw materials of Substrates B and C were of European manufacture. It is believed that the different raw materials, particularly, the different plasticizers, affect the ability of the coating compositions to adhere to the substrates.

The coating composition of the present invention which includes significantly more polyurethane than the examples of Bolgiano et al. adhered to the Substrate A as well as Substrates B and C. Therefore, the adhesive property of the coating composition of the present invention is clearly superior to that of the Bolgiano et al. examples.

EXAMPLE 6

In another embodiment of the present invention, it was determined that applying an aminoplast/polyurethane coating to a gelled but unfused substrate and simultaneously fusing the vinyl substrate and curing the polyurethane yielded a structure in which the aminoplast/polyurethane coating adhered very well to the vinyl substrate even at lower concentrations of polyurethane. Further, such a process yielded a strongly adhered aminoplast/polyurethane coating when the aminoplast/polyurethane composition was applied in an aqueous solution.

Table I below lists numerous compositions which were applied to the vinyl Substrate A of Example 4 after the substrate had been gelled but not fused. The coating compositions were then applied with a 1 mil Bird blade and cured at 195° C. for 1.5 minutes. The percent aminoplast, polyurethane, and epoxy resin is weight percent based on total amount of aminoplast, polyurethane, and epoxy resin. The amount of reactants, solvents and additives are in parts by weight.

TABLE I

| | Formulation | | | |
|---|---|---|---|---|
| Reactants | 5 (a) | 5 (b) | 5 (c) | 5 (d) |
| Melamine resin[1] | 1.9 | 1.9 | 1.9 | 3.0 |
| Urea formaldehyde resin[2] | 1.9 | 1.9 | 1.9 | — |
| Polyurethane[3] | 24.7 | 24.7 | 12.3 | 15.0 |
| Diol[4] | 1.0 | 1.0 | 1.0 | — |
| Epoxy resin | 11.8[5] | 11.8[5] | 18.5[5] | 15.2[5] |
| Solvents | | | | |
| Water | 4.4 | 4.4 | 10.1 | 14.9 |
| Texanol[10] | 1.9 | 1.9 | 1.9 | 1.5 |
| Additives | | | | |
| Surfactant | 1.43 | 1.43 | 1.43 | 1.25 |
| Acid catalyst[11] | .93 | .93 | .93 | .72 |
| Wt. % Major Components | | | | |
| % Aminoplast | 21.4 | 21.4 | 21.5 | 18.9 |
| % Polyurethane | 41.9 | 41.9 | 20.9 | 28.4 |
| % Epoxy resin | 36.7 | 36.7 | 57.6 | 52.7 |

| | Formulation | | | |
|---|---|---|---|---|
| Reactants | 5 (e) | 5 (f) | 5 (g) | 5 (h) |
| Melamine resin[1] | 6.7 | 5.7 | 1.3 | 4.3 |
| Urea-formaldehyde resin[2] | — | — | — | — |
| Polyurethane[3] | 11.7 | 11.7 | 11.7 | 16.3 |
| Diol[4] | — | — | — | — |
| Epoxy resin | 15.9[5] | 15.5[6] | 23.6[6] | 15.5[6] |
| Solvents | | | | |
| Water | 11.7 | 13.1 | 9.4 | 9.9 |
| Texanol[10] | 1.8 | 1.8 | 1.8 | 1.8 |
| Additives | | | | |
| Surfactant | 1.38 | 1.38 | 1.38 | 1.38 |
| Acid catalyst[11] | .84 | .84 | .84 | .84 |
| Wt. % Major Components | | | | |
| % Aminoplast | 30.0 | 32.5 | 7.4 | 24.5 |
| % Polyurethane | 20.1 | 20.0 | 20.1 | 27.9 |
| % Epoxy resin | 49.9 | 47.5 | 72.5 | 47.6 |

| | Formulation | | | |
|---|---|---|---|---|
| Reactants | 5 (i) | 5 (j) | 5 (k) | 5 (l) |
| Melamine resin[1] | 1.3 | 4.3 | 2.7 | 2.7 |
| Urea-formaldehyde resin[2] | — | — | — | — |
| Polyurethane[3] | 16.3 | 11.7 | 11.7 | 16.3 |
| Diol[4] | — | — | — | — |
| Epoxy resin | 21.0[6] | 18.1[6] | 21.0[6] | 18.4[6] |
| Solvents | | | | |
| Water | 7.4 | 11.9 | 10.6 | 8.6 |
| Texanol[10] | 1.8 | 1.8 | 1.8 | 1.8 |
| Additives | | | | |
| Surfactant | 1.38 | 1.38 | 1.38 | 1.38 |
| Acid catalyst[11] | .84 | .84 | .84 | .84 |
| Wt. % Major Components | | | | |
| % Aminoplast | 7.4 | 24.5 | 15.4 | 15.4 |
| % Polyurethane | 28.0 | 20.0 | 20.0 | 28.0 |
| % Epoxy resin | 64.6 | 55.5 | 64.5 | 56.6 |

| | Formulation | | | |
|---|---|---|---|---|
| Reactants | 5 (m) | 5 (n) | 5 (o) | 5 (p) |
| Melamine resin[1] | 1.8 | 3.2 | 1.8 | 1.8 |
| Urea-formaldehyde resin[2] | — | — | — | — |
| Polyurethane[3] | 20.4 | 15.8 | 15.8 | 5.8 |
| Diol[4] | — | — | — | — |
| Epoxy | 17.6[7] | 17.6[7] | 20.2[7] | 27.9[8] |
| Solvents | | | | |
| Water | 6.2 | 9.4 | 8.2 | 10.5 |

TABLE I-continued

| | | | | |
|---|---|---|---|---|
| Texanol[10] | 1.8 | 1.8 | 1.8 | 1.8 |
| Additives | | | | |
| Surfactant | 1.38 | 1.38 | 1.38 | 1.38 |
| Acid catalyst[11] | .84 | .84 | .86 | .86 |
| Wt. % Major Components | | | | |
| % Aminoplast | 10.3 | 18.2 | 10.3 | 10.3 |
| % Polyurethane | 34.9 | 27.0 | 27.2 | 9.9 |
| % Epoxy resin | 54.9 | 54.8 | 62.4 | 79.8 |

| | Formulation | | | |
|---|---|---|---|---|
| Reactants | 5 (q) | 5 (r) | 5 (s) | 5 (t) |
| Melamine resin[1] | 4.7 | 1.8 | 1.8 | 3.2 |
| Urea-formaldehyde resin[2] | — | — | — | — |
| Polyurethane[3] | 10.5 | 10.5 | 17.4 | 5.8 |
| Diol[4] | — | — | — | — |
| Epoxy resin | 19.2[8] | 25.1[8] | 22.0[8] | 25.1[8] |
| Solvents | | | | |
| Water | 11.6 | 8.6 | 4.8 | 11.9 |
| Texanol[10] | 1.8 | 1.8 | 1.8 | 1.8 |
| Additives | | | | |
| Surfactant | 1.38 | 1.38 | 1.38 | 1.38 |
| Acid catalyst[11] | .86 | .86 | .86 | .86 |
| Wt. % Major Components | | | | |
| % Aminoplast | 26.9 | 10.3 | 10.0 | 18.3 |
| % Polyurethane | 18.0 | 17.9 | 28.9 | 9.9 |
| % Epoxy resin | 55.1 | 71.8 | 61.1 | 71.8 |

| | Formulation | | | |
|---|---|---|---|---|
| Reactants | 5 (u) | 5 (v) | 5 (w) | 5 (x) |
| Melamine resin[1] | 3.2 | 1.8 | 3.2 | 1.8 |
| Urea-formaldehyde resin[2] | — | — | — | — |
| Polyurethane[3] | 10.5 | 5.8 | 17.4 | 10.5 |
| Diol[4] | — | — | — | — |
| Epoxy resin | 22.3[8] | 26.0[6] | 17.9[6] | 23.4[6] |
| Solvents | | | | |
| Water | 10.0 | 12.4 | 7.5 | 10.3 |
| Texanol[10] | 1.8 | 1.8 | 1.8 | 1.8 |
| Additives | | | | |
| Surfactant | 1.38 | 1.38 | 1.38 | 1.38 |
| Acid catalyst[11] | .86 | .86 | .86 | .86 |
| Wt. % Major Components | | | | |
| % Aminoplast | 18.2 | 10.3 | 17.7 | 10.3 |
| % Polyurethane | 18.0 | 9.9 | 28.9 | 17.9 |
| % Epoxy resin | 63.8 | 79.8 | 53.4 | 71.8 |

| | Formulation | | |
|---|---|---|---|
| Reactants | 5 (y) | 5 (z) | 5 (aa) |
| Melamine resin[1] | 3.2 | 3.2 | 3.2 |
| Urea-formaldehyde resin[2] | — | — | — |
| Polyurethane[3] | 5.8 | 10.5 | 10.5 |
| Diol[4] | — | — | — |
| Epoxy resin | 23.4[6] | 20.8[6] | 21.8[9] |
| Solvents | | | |
| Water | 13.6 | 11.5 | 10.5 |
| Texanol[10] | 1.8 | 1.8 | 1.8 |
| Additives | | | |
| Surfactant | 1.38 | 1.38 | 1.38 |
| Acid catalyst[11] | .86 | .86 | .86 |
| Wt. % Major Components | | | |
| % Aminoplast | 18.3 | 18.2 | 18.2 |
| % Polyurethane | 9.9 | 18.0 | 18.0 |
| % Epoxy resin | 71.8 | 63.8 | 63.8 |

[1]Monsanto Resimene 745 (100% solids) except 5 (e) which was Monsanto RAQ7750 (78.5% solids)
[2]Monsanto Resimene U-975 (100% solids)
[3]Spencer-Kellogg Products EA6010 (30% solids), except 5 (b), 5 (c) and 5 (d) which were Sanncor S11402 (30% solids), a polyurethane having a carboxyl terminal end group
[4]Union Carbide EDO 204 (90% solids)
[5]Hi-Tek Polymers CMD 3540 (55% solids)
[6]Hi-Tek Polymers RGX84474 (53.8% solids)
[7]Hi-Tek Polymers RGX84477 (54.7% solids)
[8]Hi-Tek Polymers RGX84476 (50.2% solids)
[9]Hi-Tek Polymers RGX87721 (51.4% solids)
[10]Manufactured by Eastman Kodak
[11]King Industries Nacure XP-188 (25% solids)

Each example passed the cross-hatch adhesion Test ASTM D-3359.

What is claimed is:

1. A resilient surface covering comprising a resilient vinyl support surface and a crosslinked aminoplast/polyurethane wear layer directly bonded to said support surface; said wear layer comprising substantially uniformly distributed polyurethane and aminoplast; said wear layer containing at least 20% and no greater than 48% polyurethane by weight based on polyurethane, aminoplast and any epoxy resin in said wear layer, said polyurethane being an aliphatic polyurethane having a plurality of carboxyl groups.

2. The surface covering of claim 1 wherein the wear layer further comprises substantially uniformly distributed acrylate or methacrylate polymer.

3. The surface covering of claim 1 wherein the wear layer contains 15% to 55% aminoplast by weight based on polyurethane, aminoplast and any epoxy resin in the wear layer.

4. The surface covering of claim 3 wherein the wear layer contains 10% to 50% epoxy resin by weight based on polyurethane, aminoplast and epoxy resin in the wear layer.

5. The surface covering of claim 4 wherein the wear layer contains at least 30% and no greater than 48% polyurethane by weight based on polyurethane, aminoplast and any epoxy resin in the wear layer.

6. The surface covering of claim 1 wherein the aminoplast is an alkylated melamine formaldehyde resin.

7. The surface covering of claim 1 wherein the surface covering is a floor covering.

8. The surface covering of claim 1 wherein the wear layer contains at least 20% and no greater than about 42% polyurethane by weight based on polyurethane, aminoplast and any epoxy resin in the wear layer.

* * * * *